United States Patent
Nakagawa (10) Patent No.: US 12,028,801 B2
(45) Date of Patent: Jul. 2, 2024

(54) COMMUNICATIONS DEVICE, VEHICLE, CONTROL METHOD, AND CONTROL PROGRAM

(71) Applicant: TOYOTA JIDOSHA KABUSHIKI KAISHA, Toyota (JP)

(72) Inventor: Hiroto Nakagawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 416 days.

(21) Appl. No.: 17/462,631

(22) Filed: Aug. 31, 2021

(65) Prior Publication Data

US 2022/0116863 A1    Apr. 14, 2022

(30) Foreign Application Priority Data

Oct. 12, 2020  (JP) ................................ 2020-172193

(51) Int. Cl.
*H04W 48/18* (2009.01)
*H04W 4/40* (2018.01)
*H04W 88/06* (2009.01)

(52) U.S. Cl.
CPC ............ *H04W 48/18* (2013.01); *H04W 4/40* (2018.02); *H04W 88/06* (2013.01)

(58) Field of Classification Search
CPC ....... H04W 48/18; H04W 4/40; H04W 88/06; H04W 84/005
See application file for complete search history.

(56) References Cited

U.S. PATENT DOCUMENTS

| | | | | |
|---|---|---|---|---|
| 7,698,078 | B2 * | 4/2010 | Kelty | B60L 55/00 702/182 |
| 8,630,764 | B2 * | 1/2014 | Dabholkar | H04W 4/48 701/32.4 |
| 8,768,567 | B2 * | 7/2014 | Diab | B60W 50/00 709/224 |
| 9,114,709 | B2 * | 8/2015 | Stanek | H02J 7/342 |
| 10,093,251 | B2 * | 10/2018 | Rutherford | B60R 16/03 |
| 2011/0095905 | A1 * | 4/2011 | Mase | H04L 67/61 340/901 |
| 2018/0262886 | A1 * | 9/2018 | Hayakawa | H04W 4/027 |
| 2020/0167627 | A1 * | 5/2020 | Volkerink | H04W 4/029 |
| 2021/0026344 | A1 * | 1/2021 | Yasuda | G05D 1/0016 |
| 2022/0116863 | A1 * | 4/2022 | Nakagawa | H04W 48/18 |
| 2023/0016935 | A1 * | 1/2023 | Watanabe | H02J 50/80 |

FOREIGN PATENT DOCUMENTS

| | | | | |
|---|---|---|---|---|
| CN | 110149337 | A | 8/2019 | |
| JP | 2004-32164 | A | 1/2004 | |
| JP | 2006-347299 | A | 12/2006 | |
| JP | 2016-63338 | A | 4/2016 | |
| JP | 2016063338 | A * | 4/2016 | |
| JP | 2020-028032 | A | 2/2020 | |
| WO | 2017/047351 | A1 | 3/2017 | |
| WO | WO-2017047351 | A1 * | 3/2017 | ............ G11B 5/035 |
| WO | WO-2018064179 | A1 * | 4/2018 | |

* cited by examiner

*Primary Examiner* — Julio R Perez
(74) *Attorney, Agent, or Firm* — Sughrue Mion, PLLC (57) ABSTRACT

A communications device provided in a vehicle having a plurality of functions involving communication includes: a communications portion configured to use a communications standard designated for each of the functions; and a controlling portion configured to determine whether the communications standard is to be restricted from being used by the communications portion or not, in accordance with a state of the vehicle.

16 Claims, 9 Drawing Sheets

PRIORITY LEVEL MANAGEMENT TABLE

4(LOW) ⟶ 1(HIGH)

| COMMUNICATIONS STANDARD | Priority |
|---|---|
| CELLULAR | 1 |
| V2X | 2 |
| WIRELESS LAN | 3 |
| SHORT-DISTANCE WIRELESS | 4 |

COMMUNICATIONS STANDARD MANAGEMENT TABLE 4000

| | Va | Vb | Vc | Vd |
|---|---|---|---|---|
| VA | STOP COMMUNICATION WITH Priority = 3 OR LESS | STOP COMMUNICATION WITH Priority = 3 OR LESS | STOP COMMUNICATION WITH Priority = 4 OR LESS | — |
| VB | STOP COMMUNICATION WITH Priority = 3 OR LESS | STOP COMMUNICATION WITH Priority = 3 OR LESS | STOP COMMUNICATION WITH Priority = 3 OR LESS | STOP COMMUNICATION WITH Priority = 4 OR LESS |
| VC | STOP COMMUNICATION WITH Priority = 3 OR LESS | STOP COMMUNICATION WITH Priority = 3 OR LESS | STOP COMMUNICATION WITH Priority = 3 OR LESS | STOP COMMUNICATION WITH Priority = 3 OR LESS |
| VD | STOP COMMUNICATION WITH Priority = 2 OR LESS | STOP COMMUNICATION WITH Priority = 2 OR LESS | STOP COMMUNICATION WITH Priority = 2 OR LESS | STOP COMMUNICATION WITH Priority = 2 OR LESS |

FIG. 8

COMMUNICATIONS STANDARD MANAGEMENT TABLE 5000

| | Va | Vb | Vc | Vd |
|---|---|---|---|---|
| VA | START COMMUNICATION WITH Priority = 2 OR MORE | START COMMUNICATION WITH Priority = 2 OR MORE | START COMMUNICATION WITH Priority = 3 OR MORE | START ALL TYPES OF COMMUNICATION |
| VB | START COMMUNICATION WITH Priority = 2 OR MORE | START COMMUNICATION WITH Priority = 2 OR MORE | START COMMUNICATION WITH Priority = 2 OR MORE | START COMMUNICATION WITH Priority = 3 OR MORE |
| VC | START COMMUNICATION WITH Priority = 2 OR MORE | START COMMUNICATION WITH Priority = 2 OR MORE | START COMMUNICATION WITH Priority = 2 OR MORE | START COMMUNICATION WITH Priority = 2 OR MORE |
| VD | — | — | — | — |

FIG. 9

PRIORITY LEVEL MANAGEMENT TABLE

5(LOW) ⟶ 1(HIGH)

| COMMUNICATIONS STANDARD | Priority |
|---|---|
| 4G | 1 |
| V2X | 2 |
| WIRELESS LAN | 3 |
| 5G | 4 |
| SHORT-DISTANCE WIRELESS | 5 |

COMMUNICATIONS DEVICE, VEHICLE, CONTROL METHOD, AND CONTROL PROGRAM

CROSS-REFERENCE TO RELATED APPLICATION

This application claims priority to Japanese Patent Application No. 2020-172193 filed on Oct. 12, 2020, incorporated herein by reference in its entirety.

BACKGROUND

1. Technical Field

The present disclosure relates to a communications device, a vehicle, a control method, and a control program.

2. Description of Related Art

Japanese Unexamined Patent Application Publication No. 2020-028032 (JP 2020-028032 A) describes a communications device including a detection portion, a position acquisition portion, a wireless communications portion, a storage portion, an additional information acquisition portion, and a power controlling portion. The detection portion is configured to detect a stop of a drive source of a vehicle. The position acquisition portion is configured to acquire positional information of the vehicle. The wireless communications portion is configured to wirelessly communicate with a base station. In the storage portion, information on a communicable area where the communications device can communicate with the base station is stored. The additional information acquisition portion is configured to acquire additional information that is information other than the positional information and that influences the communication of the wireless communications portion. The power controlling portion is configured to, when the drive source of the vehicle is stopped, determine a time condition to shift to a stop state in which the power consumption of the communications device is minimum, the time condition being determined based on the relationship between the vehicle position and the communicable area, the additional information, and a communication state between the wireless communications portion and the base station.

SUMMARY

Along with the spread of connected cars and automated driving cars utilizing wireless communications, it becomes essential not to cut off a power supply and not to lose communication. That is, it is demanded to keep necessary communication while the power consumptions of vehicles are reduced.

An object of this disclosure is to keep necessary communication while the power consumption of a vehicle is reduced.

A communications device according to this disclosure is a communications device provided in a vehicle having a plurality of functions involving communication. The communications device includes: a communications portion configured to use a communications standard designated for each of the functions; and a controlling portion configured to determine whether the communications standard is to be restricted from being used by the communications portion or not, in accordance with a state of the vehicle.

A control method according to this disclosure is a control method for controlling a communications device provided in a vehicle having a plurality of functions involving communication. The control method includes: using, by a communications portion, a communications standard designated for each of the functions; and determining, by a controlling portion, whether the communications standard is to be restricted from being used by the communications portion or not, in accordance with a state of the vehicle.

A control program according to this disclosure is a control program configured to cause a computer to execute an operation. The computer is configured to function as a communications device provided in a vehicle having a plurality of functions involving communication and including a communications portion configured to use a communications standard designated for each of the functions. The operation including determining whether the communications standard is to be restricted from being used by the communications portion or not, in accordance with a state of the vehicle.

With this disclosure, it is possible to keep necessary communication while the power consumption of a vehicle is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following will describe some embodiments of this disclosure with reference to the drawings.

The same or equivalent portions in the drawings have the same reference sign. In the following description of each embodiment, descriptions about the same or equivalent portions are omitted or simplified appropriately.

The following describes a first embodiment as one embodiment of this disclosure.

Figure 1:
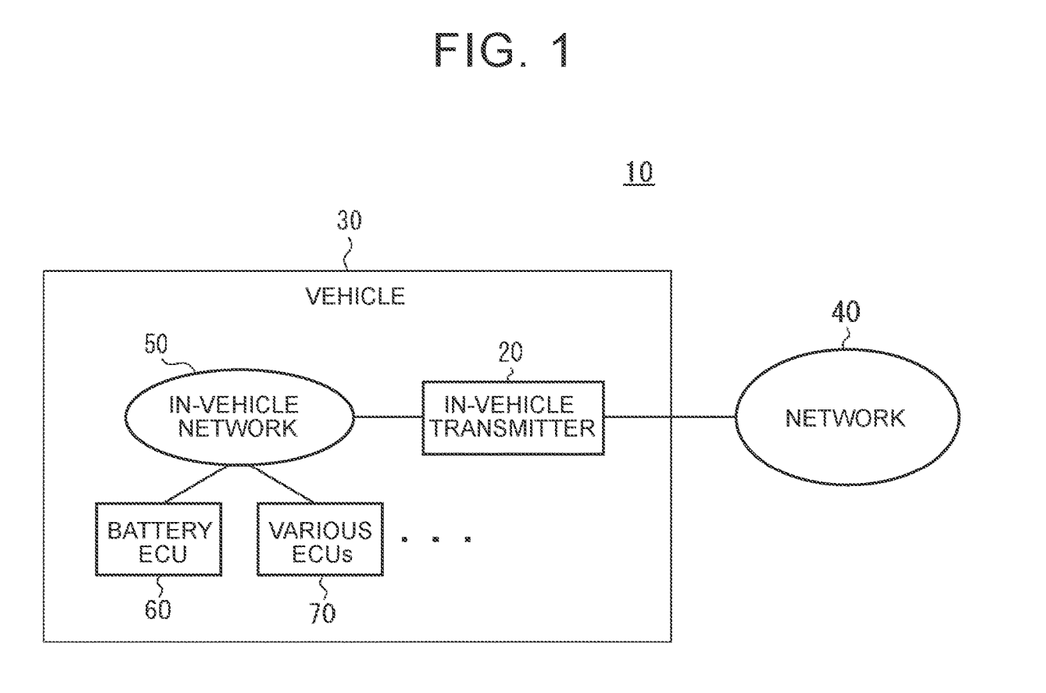
FIG. 1 is a view illustrating a configuration of a system according to a first embodiment of this disclosure.

With reference to FIG. 1, the following describes a configuration of a system 10 according to the present embodiment.

The system 10 includes an in-vehicle transmitter 20 as a communications device provided in a vehicle 30.

In the present embodiment, the in-vehicle transmitter 20 is a device configured to perform wireless communication. The in-vehicle transmitter 20 can communicate with an external device provided outside the vehicle 30 via a given network 40. The in-vehicle transmitter 20 may be incorporated into a car navigation system.

The network 40 includes the Internet, at least one WAN, at least one MAN, at least one LAN, or a combination thereof. The "WAN" is an abbreviation of Wide Area Network. The "MAN" is an abbreviation of Metropolitan Area Network. The "LAN" is an abbreviation of Local Area Network. The network 40 may include at least one wireless network, at least one optical network, or a combination thereof. The wireless network is, for example, an ad-hoc network, a cellular network, a wireless LAN, a satellite communications network, or a terrestrial microwave network.

The vehicle 30 is an automobile of a given type such as a gasoline-powered car, a diesel car, an HV, a PHV, an EV, or an FCV, for example. The "HV" is an abbreviation of Hybrid Vehicle. The "PHV" is an abbreviation of Plug-in Hybrid Vehicle. The "EV" is an abbreviation of Electric Vehicle. The "FCV" is an abbreviation of Fuel Cell Vehicle. The vehicle 30 may be a private automobile or may be operated as a taxi or an on-demand bus. The vehicle 30 is driven by a driver in the present embodiment, but its operation may be automated at a given level. The level of the automation is any level from level 1 to level 5 based on the classification of SAE, for example. The "SAE" is an abbreviation of Society of Automotive Engineers. The vehicle 30 may be also a vehicle for exclusive use of MaaS. The "MaaS" is an abbreviation of Mobility as a Service.

Various ECUs configured to control various parts in the vehicle 30 are provided in the vehicle 30. The "ECU" is an abbreviation of Electronic Control Unit. More specifically, a battery ECU 60 and other ECUs 70 are provided. The in-vehicle transmitter 20 can communicate with the battery ECU 60 and the other ECUs 70 via an in-vehicle network 50, for example.

The in-vehicle network 50 is, for example, a network in conformity with a CAN standard. The "CAN" is an abbreviation of Controller Area Network. The in-vehicle network 50 may include Ethernet (registered trademark), FlexRay (registered trademark), or a combination thereof.

The battery ECU 60 monitors a battery in the vehicle 30 and detects a battery remaining amount. The other ECUs 70 include an MG-ECU configured to control an electric machine of the vehicle 30, an engine ECU configured to control an internal combustion engine, a transmission ECU configured to control the rotation and the output (torque) of the engine, and so on. The "MG" is an abbreviation of Motor Generator.

The vehicle 30 may further include various sensors. The various sensors include a vehicle speed sensor, a positioning sensor, a range-finding sensor, a direction sensor, an acceleration sensor, an angular velocity sensor, an obstacle sensor, and so on. The vehicle speed sensor detects the traveling speed of the vehicle 30. The positioning sensor measures the position of the vehicle 30. The positioning sensor includes at least one GNSS receiver. The GNSS is, for example, a GPS, a QZSS, BeiDou, a GLONASS, or Galileo, for example. The "GNSS" is an abbreviation of Global Navigation Satellite System. The "GPS" is an abbreviation of Global Positioning System. The "QZSS" is an abbreviation of Quasi-Zenith Satellite System. A satellite of the QZSS is called a quasi-zenith satellite. The "GLONASS" is an abbreviation of Global Navigation Satellite System. The range-finding sensor measures distances to a standstill object and a moving object present around the vehicle 30. The direction sensor measures the direction of the vehicle 30. The acceleration sensor measures the acceleration of the vehicle 30. The angular velocity sensor is an inertial sensor configured to measure the rotation angular velocity of the vehicle 30. The obstacle sensor detects an obstacle around the vehicle 30.

With reference to FIG. 1, the outline of the present embodiment will be described.

As a method for reducing the power consumption of the vehicle 30, it is conceivable to control a communication state. The controlling of a communication state includes controlling of the use of a communications standard. In the present embodiment, the vehicle 30 has a plurality of functions involving communication. The in-vehicle transmitter 20 as a communications device using a communications standard designated for each function is provided in the vehicle 30. The in-vehicle transmitter 20 detects a state of the vehicle 30 and determines whether the communications standard is to be restricted from being used or not, in accordance with the detected state of the vehicle 30.

In the present embodiment, as the functions each involving communication, the vehicle 30 has an emergency call function, a concierge function, a vehicle-to-vehicle communication function, a vehicle-to-infrastructure communication function, a software download function, a first automatic parking function, a keyless entry function, a remote starter function, and a second automatic parking function. The emergency call function is a function to automatically make an outgoing call to an operator in an emergency such as an accident or sudden illness and to allow a user to speak with the operator over the phone. The concierge function is a function to manually make an outgoing call to an operator at the time when a user wants an operator's support and to allow the user to speak with the operator over the phone. The emergency call function and the concierge function perform communication by use of a cellular communications standard so that the user speaks with the operator over the phone. The cellular communications standard is, for example, LTE, a 4G standard, or a 5G standard. The "LTE" is an abbreviation of Long Term Evolution. The "4G" is an abbreviation of 4th Generation. The "5G" is an abbreviation of 5th Generation. The vehicle-to-vehicle communication function and the vehicle-to-infrastructure communication function are functions to perform wireless communication for the purpose that the vehicle 30 exchanges data with surroundings around the vehicle 30. The vehicle-to-vehicle communication function includes a function for the vehicle 30 to receive, from an emergency vehicle around the vehicle 30, data indicative of the position of the emergency vehicle, for example. The vehicle-to-infrastructure communication function includes a function for the vehicle 30 to receive, from a traffic light around the vehicle 30, data indicative of a remaining time of a red light, for example. The vehicle-to-vehicle communication function and the vehicle-to-infrastructure communication function perform wireless communication by use of a V2X communications standard. The V2X communications standard is, for example, cellular V2X or DSRC. The "V2X" is an abbreviation of Vehicle-to-Everything. The "DSRC" is an abbreviation of Dedicated Short Range Communications. The software download function is a function to download software for the vehicle 30 or updated software by accessing a server on the Internet via a wireless LAN usable freely or cheaply such as a wireless LAN in a vehicle factory, a wireless LAN in a store of the vehicle, a wireless LAN in a house of the user, or a public wireless LAN. The software download function may include a function to automatically update software. The first automatic parking function is a function to automatically park the vehicle 30 in accordance with the operation of a smartphone by the user. The software download function and the first automatic parking function perform wireless communication by use of a wireless LAN communications standard. The wireless LAN communications standard is, for example, Wi-Fi (registered trademark). The "Wi-Fi" is an abbreviation of Wireless Fidelity. The keyless entry function is a function to lock or unlock a door of the vehicle 30 in accordance with the operation of the smartphone by the user. The remote starter function is a function to start the engine of the vehicle 30 or turn on the power supply of the vehicle 30 in accordance with the operation of the smartphone by the user. The second automatic parking function is a function to automatically park the vehicle 30 in accordance with the operation of the smartphone by the user. The keyless entry function, the remote starter function, and the second automatic parking function perform wireless communication by use of a short-distance wireless communications standard. The short-distance wireless communications standard is, for example, Bluetooth (registered trademark).

In the present embodiment, in terms of the communications standard designated for each function of the vehicle 30, the in-vehicle transmitter 20 as a communications device determines whether the communications standard is to be restricted from being used or not in accordance with the state of the vehicle 30. For example, in a case where it is necessary to reduce the power consumption of the vehicle 30, the in-vehicle transmitter 20 restricts only the use of a communications standard designated for a function that is not used. Accordingly, with the present embodiment, it is possible to keep necessary communication while the power consumption of the vehicle 30 is reduced.

Figure 2:
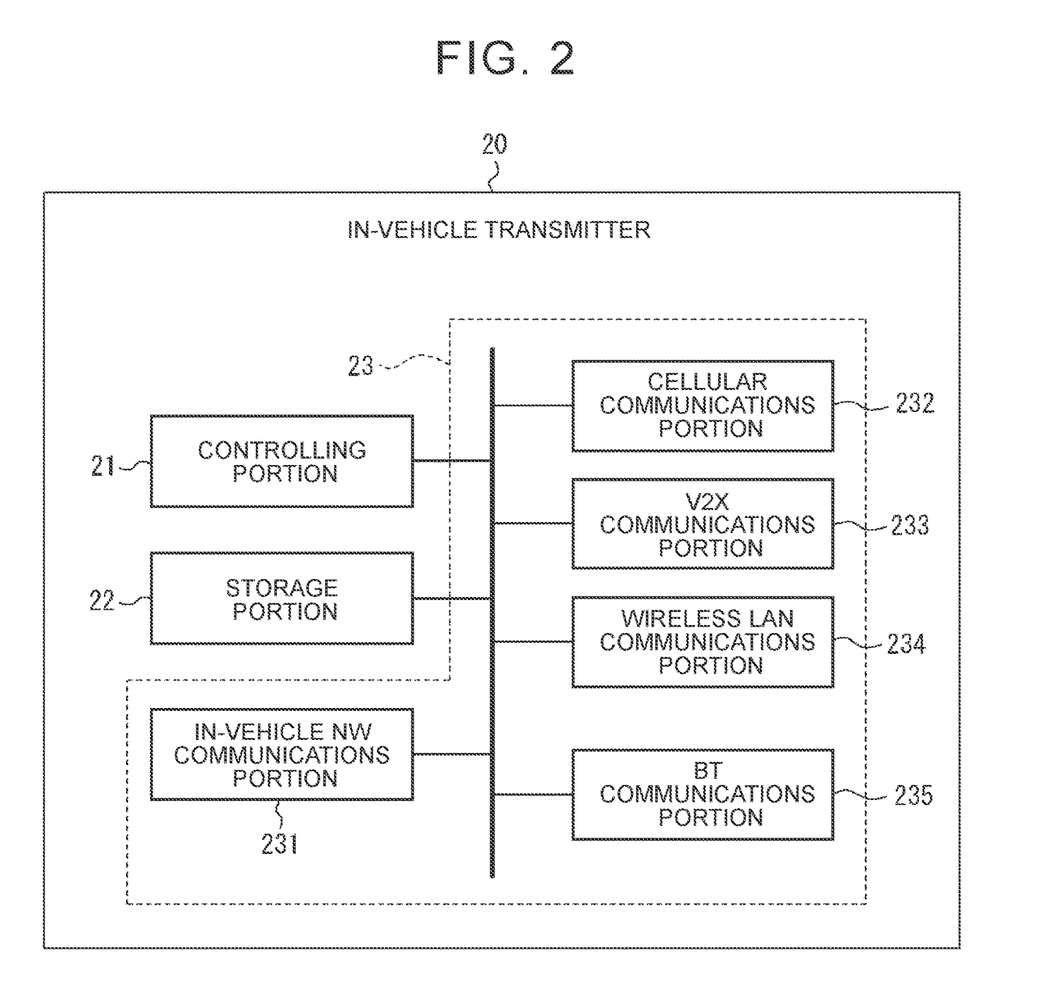
FIG. 2 is a block diagram illustrating a configuration of an in-vehicle transmitter as a communications device according to the first embodiment of this disclosure.

With reference to FIG. 2, the following describes a configuration of the in-vehicle transmitter 20 as the communications device according to the present embodiment.

The in-vehicle transmitter 20 includes a controlling portion 21, a storage portion 22, and a communications portion 23.

The controlling portion 21 includes at least one processor, at least one programmable circuit, at least one dedicated circuit, or a combination thereof. The processor is a general purpose processor such as a CPU or a GPU, or a dedicated processor devoted to a specific process. The "CPU" is an abbreviation of Central Processing Unit. The "GPU" is an abbreviation of Graphics Processing Unit. The programmable circuit is, for example, an FPGA. The "FPGA" is an abbreviation of Field-Programmable Gate Array. The dedicated circuit is, for example, an ASIC. The "ASIC" is an abbreviation of Application Specific Integrated Circuit. The controlling portion 21 executes processing related to the operation of the in-vehicle transmitter 20 while the controlling portion 21 controls each part of the in-vehicle transmitter 20.

The storage portion 22 includes at least one semiconductor memory, at least one magnetic memory, at least one optical memory, or a combination of at least any two of them. The semiconductor memory is, for example, a RAM or a ROM. The "RAM" is an abbreviation of Random Access Memory. The "ROM" is an abbreviation of Read Only Memory. The RAM is an SRAM or a DRAM, for example. The "SRAM" is an abbreviation of Static Random Access Memory. The "DRAM" is an abbreviation of Dynamic Random Access Memory. The ROM is an EEPROM, for example. The "EEPROM" is an abbreviation of Electrically Erasable Programmable Read Only Memory. The storage portion 22 functions as a main storage device, an auxiliary storage device, or a cache memory, for example. Data used for the operation of the in-vehicle transmitter 20 and data obtained by the operation of the in-vehicle transmitter 20 are stored in the storage portion 22.

Figure 3:
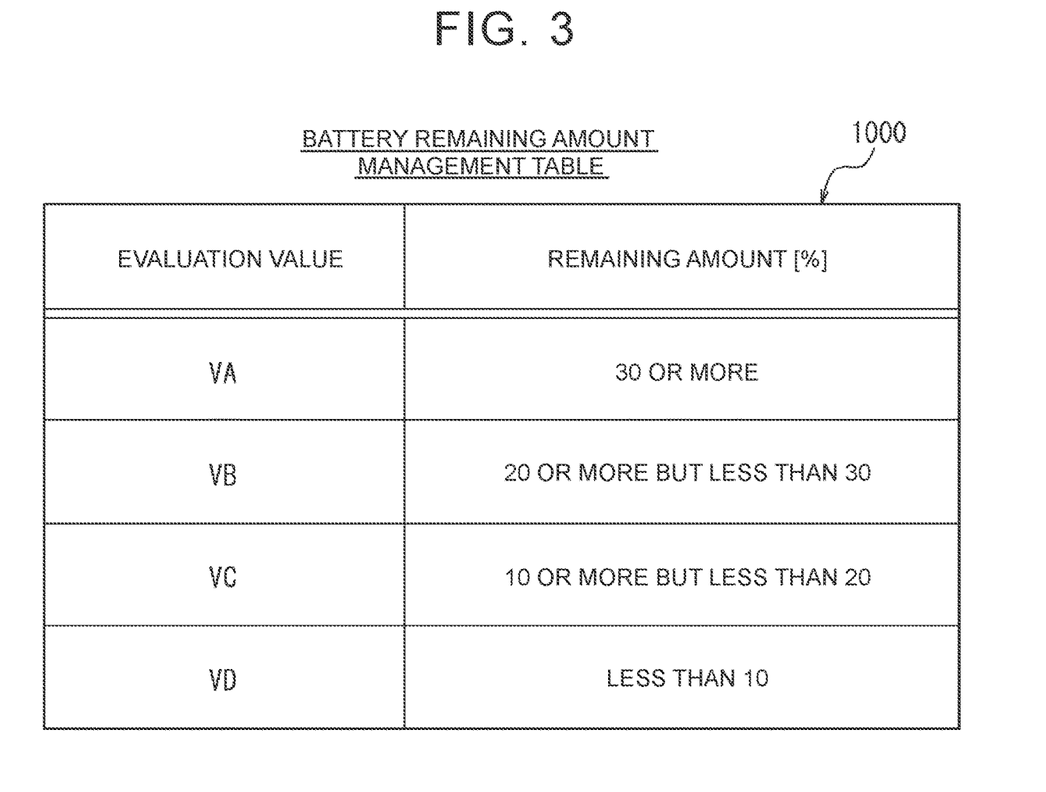
FIG. 3 is a view illustrating an example of a battery remaining amount management table according to the first embodiment of this disclosure.

A battery remaining amount management table 1000 illustrated in FIG. 3 is stored in the storage portion 22. The battery remaining amount management table 1000 may be stored in an external storage device instead of being stored in the storage portion 22. The battery remaining amount management table 1000 will be described later.

Figure 4:
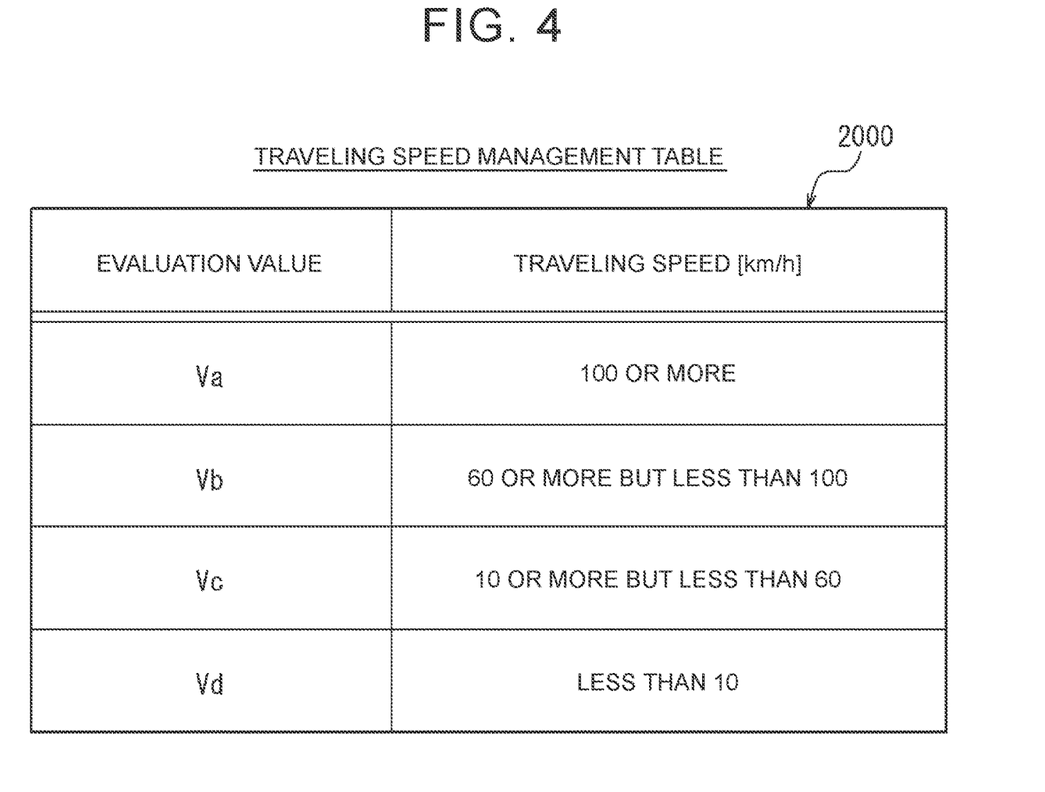
FIG. 4 is a view illustrating an example of a traveling speed management table according to the first embodiment of this disclosure.

A traveling speed management table 2000 illustrated in FIG. 4 is stored in the storage portion 22. The traveling speed management table 2000 may be stored in an external storage device instead of being stored in the storage portion 22. The traveling speed management table 2000 will be described later.

Figure 5:
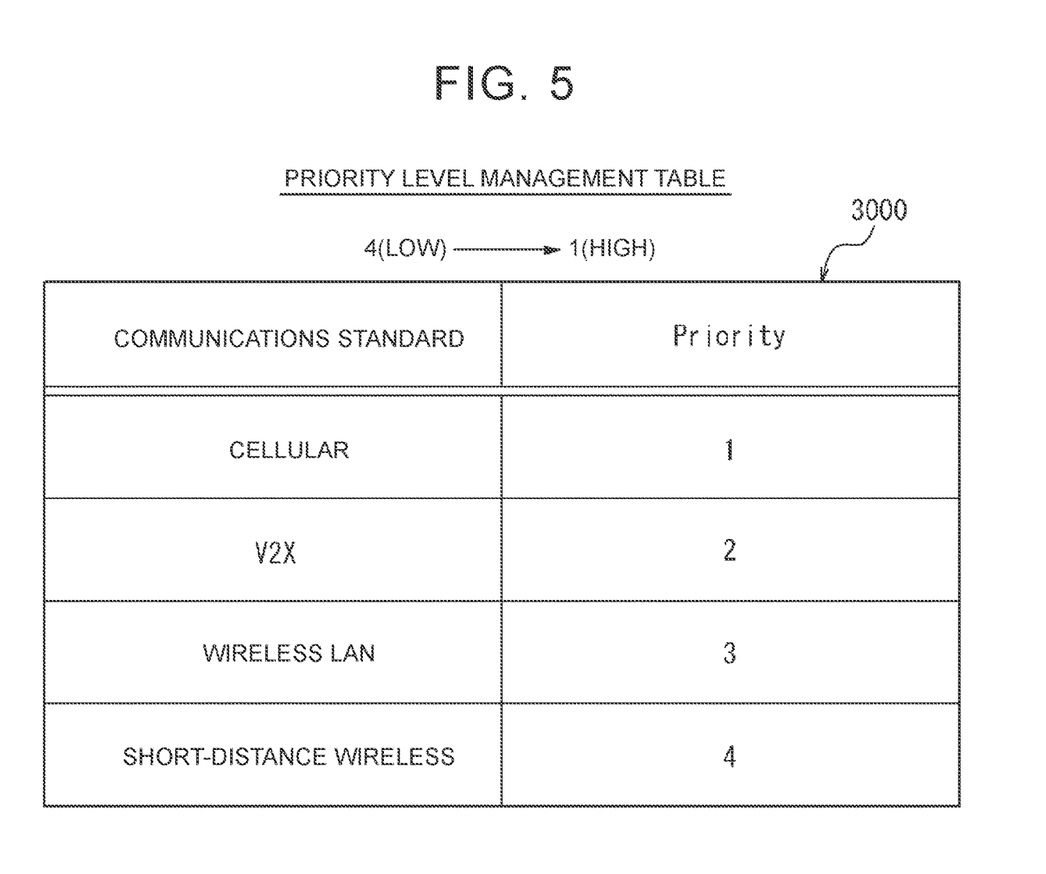
FIG. 5 is a view illustrating an example of a priority level management table according to the first embodiment of this disclosure.

A priority level management table 3000 illustrated in FIG. 5 is stored in the storage portion 22. The priority level management table 3000 may be stored in an external storage device instead of being stored in the storage portion 22. The priority level management table 3000 will be described later.

The communications portion 23 includes a plurality of communications interfaces. In the present embodiment, the communications portion 23 includes, as the communications interfaces, a cellular communications portion 232 that is an interface corresponding to the cellular communications standard, a V2X communications portion 233 that is an interface corresponding to the V2X communications standard, a wireless LAN communications portion 234 that is an interface corresponding to the wireless LAN communications standard, and a BT communications portion 235 that is an interface corresponding to the short-distance wireless communications standard. The "BT" is an abbreviation of Bluetooth. The communications portion 23 further includes an in-vehicle NW communications portion 231 that is an interface corresponding to the CAN standard such that the in-vehicle NW communications portion 231 communicates with the battery ECU 60 and the other ECUs 70 of the vehicle 30 via the in-vehicle network 50. The "NW" is an abbreviation of Network. The communications portion 23 receives data used for the operation of the in-vehicle transmitter 20 and transmits data obtained by the operation of the in-vehicle transmitter 20.

The communications portion 23 communicates with external devices provided outside the vehicle 30 by use of the communications standards. In the present embodiment, as the communications interfaces corresponding to the communications standards to be used to communicate with the external devices provided outside the vehicle 30, the communications portion 23 includes the cellular communications portion 232, the V2X communications portion 233, the wireless LAN communications portion 234, and the BT communications portion 235. The cellular communications portion 232 uses the cellular communications standard. The V2X communications portion 233 uses the V2X communications standard. The wireless LAN communications portion 234 uses the wireless LAN communications standard. The BT communications portion 235 uses the short-distance wireless communications standard. That is, the communications portion 23 uses the communications standards designated for respective functions of the vehicle 30. The communications portion 23 further includes the in-vehicle NW communications portion 231 configured to communicate with various ECUs provided in the vehicle 30 via the in-vehicle network 50. The in-vehicle NW communications portion 231 uses the CAN standard.

In the present embodiment, the communications interfaces included in the communications portion 23 are implemented as independent modules. Some of or all of the communications interfaces may be integrated as one module. A module is, for example, a modem or a communications chip.

Generally, each of the communications standards has a predetermined communications distance as a communicable distance. Among the communications standards, the cellular communications standard has a longest communications distance, and the communications distances of the V2X communications standard, the wireless LAN communications standard, and the short-distance wireless communications standard become shorter in this order.

The functions of the in-vehicle transmitter 20 as the communication device are implemented by executing a control program of the present embodiment by a processor as the controlling portion 21. That is, the functions of the in-vehicle transmitter 20 are implemented by software. The control program causes a computer to function as the in-vehicle transmitter 20 by causing the computer to execute the operation of the in-vehicle transmitter 20. That is, the computer functions as the in-vehicle transmitter 20 by executing the operation of the in-vehicle transmitter 20 in accordance with the control program.

The control program can be stored in a non-transitory computer-readable medium. The non-transitory computer-readable medium is, for example, a flash memory, a magnetic recorder, an optical disc, a magneto-optical recording medium, or a ROM. The control program is distributed by selling, transferring, or lending a portable recording medium such as an SD card, a DVD or a CD-ROM in which the control program is stored, for example. The "SD" is an abbreviation of Secure Digital. The "DVD" is an abbreviation of Digital Versatile Disc. The "CD-ROM" is an abbreviation of Compact Disc Read Only Memory. The control program may be distributed by storing the control program in a storage of a server and transferring the control program to other computers from the server. The control program may be provided as a program product.

The computer temporarily stores, in a main memory, the control program stored in the portable recording medium or the control program transferred from the server, for example. Then, the computer reads, by the processor, the control program stored in the main memory and executes, by the processor, a process in accordance with the control program thus read. The computer may directly read the control program from the portable recording medium and execute the process in accordance with the control program. The computer may sequentially execute the process in accordance with the control program every time the control program is transferred to the computer from the server. The process may be executed by a so-called ASP service that implements a function only by an execution instruction and result acquisition without transferring the control program from the server to the computer. The "ASP" is an abbreviation of Application Service Provider. The control program includes a matter that is information used for processing by an electronic computer and is equivalent to a program. For example, data that is not a direct command to the computer but has a property defining the processing of the computer corresponds to "the matter equivalent to the program."

Some of or all of the functions of the in-vehicle transmitter 20 as the communications device may be implemented by a programmable circuit or a dedicated circuit as the controlling portion 21. That is, some of or all of the functions of the in-vehicle transmitter 20 may be implemented by hardware.

With reference to FIG. 3, the following describes an exemplary configuration of the battery remaining amount management table 1000 according to the present embodiment.

In the battery remaining amount management table 1000 illustrated in FIG. 3, battery remaining amount evaluation values determined for the battery remaining amount of the vehicle 30 are stored. In the present embodiment, three thresholds are set in advance for the battery remaining amount of the vehicle 30. The three thresholds are 30, 20, 10 in descending order. The battery remaining amount of the vehicle 30 is evaluated by four levels based on the three thresholds. That is, when the battery remaining amount is 30% or more, the battery remaining amount evaluation value is determined to be VA. When the battery remaining amount is 20% or more but less than 30%, the battery remaining amount evaluation value is determined to be VB. When the battery remaining amount is 10% or more but less than 20%, the battery remaining amount evaluation value is determined to be VC. When the battery remaining amount is less than 10%, the battery remaining amount evaluation value is determined to be VD.

With reference to FIG. 4, the following describes an exemplary configuration of the traveling speed management table 2000 according to the present embodiment.

In the traveling speed management table 2000 illustrated in FIG. 4, traveling speed evaluation values determined for the traveling speed of the vehicle 30 are stored. In the present embodiment, three thresholds are set in advance for the traveling speed of the vehicle 30. The three thresholds are 100, 60, 10 in descending order. The traveling speed of the vehicle 30 is evaluated by four levels based on the three thresholds. That is, when the traveling speed is 100 km/h or more, the traveling speed evaluation value is determined to be Va. When the traveling speed is 60 km/h or more but less than 100 km/h, the traveling speed evaluation value is determined to be Vb. When the traveling speed is 10 km/h or more but less than 60 km/h, the traveling speed evaluation value is determined to be Vc. When the traveling speed is less than 10 km/h, the traveling speed evaluation value is determined to be Vd.

With reference to FIG. 5, the following describes an exemplary configuration of the priority level management table 3000 according to the present embodiment.

In the priority level management table 3000 illustrated in FIG. 5, priority levels assigned to the communications standards used by the in-vehicle transmitter 20 as the communications device of the vehicle 30 are stored. In the present embodiment, a priority level of 1 is highest, and a priority level of 4 is lowest. The priority levels may be determined by a given method. In the present embodiment, the priority levels are determined relatively based on the functions corresponding to the communications standards. For example, high availability is requested to the emergency call function among the functions of the vehicle 30, and therefore, the highest priority level of 1 is assigned to the cellular communications standard. In the meantime, the keyless entry function, the remote starter function, and the second automatic parking function are just options for improvement in convenience. Therefore, the lowest priority level of 4 is assigned to the short-distance wireless communications standard.

Figure 6:
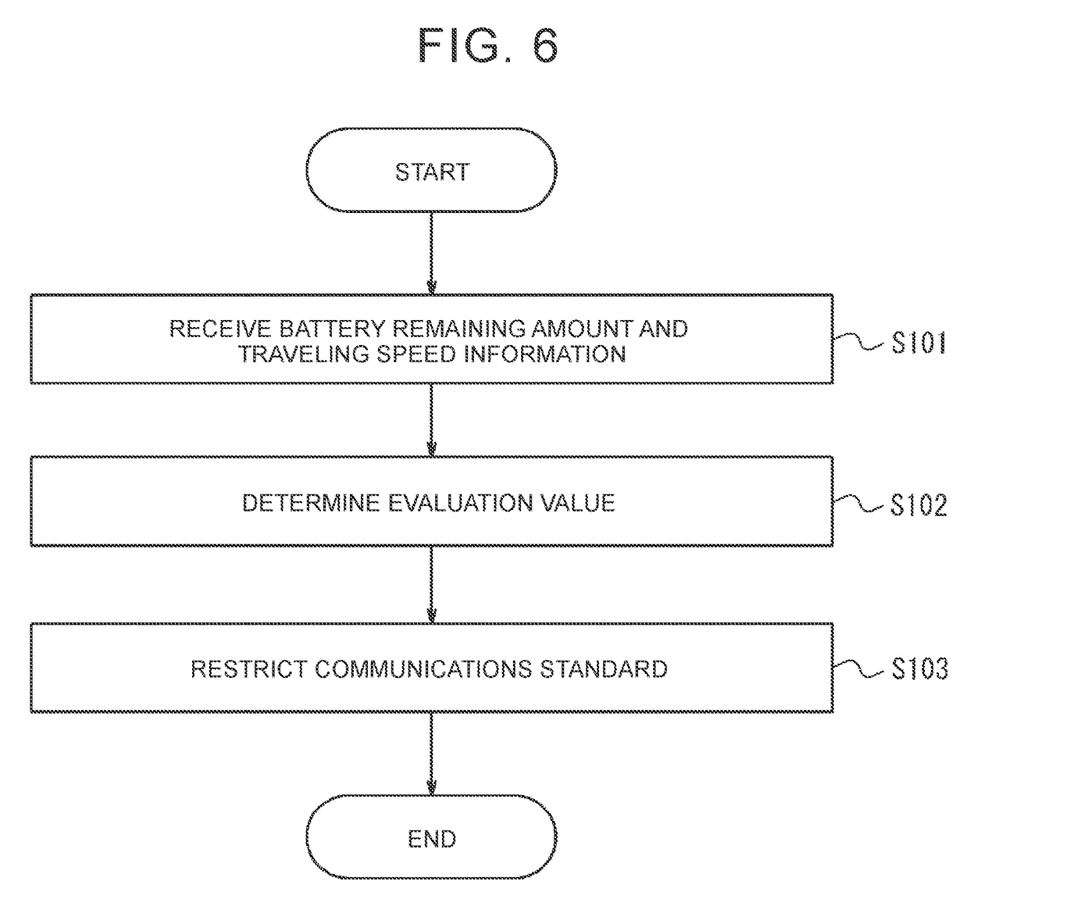
FIG. 6 is a flowchart illustrating the operation of the communications device according to the first embodiment of this disclosure.

With reference to FIG. 6, the following describes the operation of the in-vehicle transmitter 20 as the communications device according to the present embodiment. This operation corresponds to a control method according to the present embodiment.

In step S101, the state of the vehicle 30 is detected by the ECUs or sensors provided in the vehicle 30. The controlling portion 21 of the in-vehicle transmitter 20 receives information indicative of the state of the vehicle 30 via the communications portion 23. In the present embodiment, the state of the vehicle 30 includes the battery remaining amount of the vehicle 30. The battery remaining amount of the vehicle 30 is detected by the battery ECU 60 provided in the vehicle 30. The battery ECU 60 transmits information indicative of the detected battery remaining amount to the in-vehicle transmitter 20 via the in-vehicle network 50. The controlling portion 21 of the in-vehicle transmitter 20 receives the transmitted information indicative of the battery remaining amount via the in-vehicle NW communications portion 231. The controlling portion 21 stores the received information indicative of the battery remaining amount in the storage portion 22.

In step S102, the controlling portion 21 of the in-vehicle transmitter 20 determines a battery remaining amount evaluation value for the battery remaining amount detected in step S101. More specifically, the controlling portion 21 reads the information indicative of the battery remaining amount from the storage portion 22. The controlling portion 21 refers to the battery remaining amount management table 1000 illustrated in FIG. 3 and determines which one of the battery remaining amount evaluation values in the battery remaining amount management table 1000 corresponds to the battery remaining amount indicated by the information thus read out. For example, when the battery remaining amount is 50%, the controlling portion 21 determines that the battery remaining amount evaluation value is VA. When the battery remaining amount is 25%, the controlling portion 21 determines that the battery remaining amount evaluation value is VB. When the battery remaining amount is 15%, the controlling portion 21 determines that the battery remaining amount evaluation value is VC. When the battery remaining amount is 5%, the controlling portion 21 determines that the battery remaining amount evaluation value is VD.

In step S103, the controlling portion 21 of the in-vehicle transmitter 20 determines whether the communications standards are to be restricted from being used or not, based on the battery remaining amount evaluation value determined in step S102. In the present embodiment, the controlling portion 21 restricts more communications standards from being used as the battery remaining amount of the vehicle 30 is lower. This is because it is necessary to lower the power consumption as the battery remaining amount is lower. As the number of communications standards to be restricted from being used is larger, the power consumption is expected to be reduced more. More specifically, when the battery remaining amount evaluation value is VA, the controlling portion 21 determines that the battery remaining amount of the vehicle 30 is sufficient, and the controlling portion 21 does not restrict the use of any of the communications standards. When the battery remaining amount evaluation value is VB, the controlling portion 21 restricts the use of one communications standard among the communications standards. When the battery remaining amount evaluation value is VC, the controlling portion 21 restricts the use of two communications standard among the communications standards. When the battery remaining amount evaluation value is VD, the controlling portion 21 restricts the use of three communications standards among the communications standards.

Thus, the controlling portion 21 of the in-vehicle transmitter 20 as the communication device determines whether the communications standards are to be restricted from being used by the communications portion 23 or not, in accordance with the state of the vehicle 30.

As one modification of the present embodiment, the state of the vehicle 30 may include the traveling speed of the vehicle 30. The traveling speed of the vehicle 30 is detected by a given sensor such as the vehicle speed sensor provided in the vehicle 30. The sensor that has detected the traveling speed of the vehicle 30 transmits information indicative of the detected traveling speed to the in-vehicle transmitter 20 via the in-vehicle network 50. In step S101, the controlling portion 21 of the in-vehicle transmitter 20 receives the transmitted information indicative of the traveling speed via the in-vehicle NW communications portion 231 as information indicative of the state of the vehicle 30. The controlling portion 21 stores the received information indicative of the traveling speed in the storage portion 22.

In the present modification, in step S102, the controlling portion 21 of the in-vehicle transmitter 20 determines a traveling speed evaluation value for the traveling speed of the vehicle 30, the traveling speed being indicated by the information acquired in step S101. More specifically, the controlling portion 21 reads the information indicative of the traveling speed of the vehicle 30 from the storage portion 22. The controlling portion 21 refers to the traveling speed management table 2000 illustrated in FIG. 4 and determines which one of the traveling speed evaluation values in the traveling speed management table 2000 corresponds to the traveling speed of the vehicle 30, the traveling speed being indicated by the information thus read out. For example, when the traveling speed of the vehicle 30 is 105 km/h, the controlling portion 21 determines that the traveling speed evaluation value is Va. When the traveling speed of the vehicle 30 is 70 km/h, the controlling portion 21 determines that the traveling speed evaluation value is Vb. When the traveling speed of the vehicle 30 is 50 km/h, the controlling portion 21 determines that the traveling speed evaluation value is Vc. When the traveling speed of the vehicle 30 is 5 km/h, the controlling portion 21 determines that the traveling speed evaluation value is Vd.

In the present modification, in step S103, the controlling portion 21 of the in-vehicle transmitter 20 determines whether the communications standards are to be restricted from being used by the communications portion 23 or not, based on the traveling speed evaluation value determined in step S102. In the present modification, the controlling portion 21 restricts more communications standards from being used as the traveling speed is higher. As the number of communications standards to be restricted from being used is larger, the power consumption is expected to be reduced more. More specifically, when the traveling speed evaluation value is Vd, the controlling portion 21 does not restrict the use of any of the communications standards. When the traveling speed evaluation value is Vc, the controlling portion 21 restricts the use of one communications standard among the communications standards. When the traveling speed evaluation value is Vb, the controlling portion 21 restricts the use of two communications standards among the communications standards. When the traveling speed evaluation value is Va, the controlling portion 21 restricts the use of three communications standards among the communications standards.

In the present embodiment, the controlling portion 21 of the in-vehicle transmitter 20 may further determine which communications standard is to be restricted from being used by the communications portion 23. The communications standard the use of which by the communications portion 23 is to be restricted may be determined by a given method. One method is as follows. That is, in step S103, the controlling portion 21 restricts the use of the communications standards by the communications portion 23 in order from a communications standard with a shortest communicable distance. In the present embodiment, the controlling portion 21 restricts the use of the communications standards by communications portion 23 in order of the short-distance wireless communications standard, the wireless LAN communications standard, the V2X communications standard, and the cellular communications standard.

As another method for determining which communications standard is to be restricted from being used by the communications portion 23, the controlling portion 21 of the in-vehicle transmitter 20 may restrict the use of the communications standards by the communications portion 23 in order from a communications standard with a lowest priority level. The priority levels are assigned to the communications standards based on the functions corresponding thereto. More specifically, the controlling portion 21 refers to the priority level management table 3000 illustrated in FIG. 5 and restricts the use of the communications standards by the communications portion 23 in order from a communications standard the assigned priority level of which is lowest. In the present embodiment, the controlling portion 21 restricts the use of the communications standards by communications portion 23 in order of the short-distance wireless communications standard, the wireless LAN communications standard, the V2X communications standard, and the cellular communications standard.

In the present embodiment, the restricting of the use of a communications standard may include stopping communication using the communications standard. More specifically, the controlling portion 21 of the in-vehicle transmitter 20 stops communication by a communication interface corresponding to a communications standard the use of which is to be restricted from among the communications interfaces included in the communications portion 23. The controlling portion 21 may stop power supply to a module for the communications standard not to be used. For example, when the use of the short-distance wireless communications standard is restricted from among the communications standards described above, the controlling portion 21 stops communication by the BT communications portion 235.

The restricting of the use of a communications standard may include restricting the speed of communication using the communications standard. More specifically, the controlling portion 21 of the in-vehicle transmitter 20 may slow down the communication speed of the communications standard that is used. For example, when the communication speed of the cellular communications standard is to be slowed down from among the communications standards described above, the controlling portion 21 prohibits the use of the 5G standard as the cellular communications standard and permits the use of only the 4G standard or LTE.

The restricting of the use of a communications standard may include stopping at least one of functions corresponding to the communications standard. More specifically, the controlling portion 21 of the in-vehicle transmitter 20 may stop a function to which high availability is not demanded from among the functions of the vehicle 30 as described earlier. For example, among the functions of the vehicle 30 as described earlier, the emergency call function and the concierge function are functions involving communication using the cellular communications standard. However, the concierge function is considered to be a function to which high availability is not demanded in comparison with the emergency call function. In view of this, the controlling portion 21 stops only the concierge function without stopping the emergency call function.

As one modification of the first embodiment, the controlling portion 21 of the in-vehicle transmitter 20 may detect both the battery remaining amount and the traveling speed as the state of the vehicle 30 and determine which communications standard is to be restricted from being used by the communications portion 23, based on both the battery remaining amount and the traveling speed thus detected. The following describes a second embodiment as such a modification.

Figure 7:
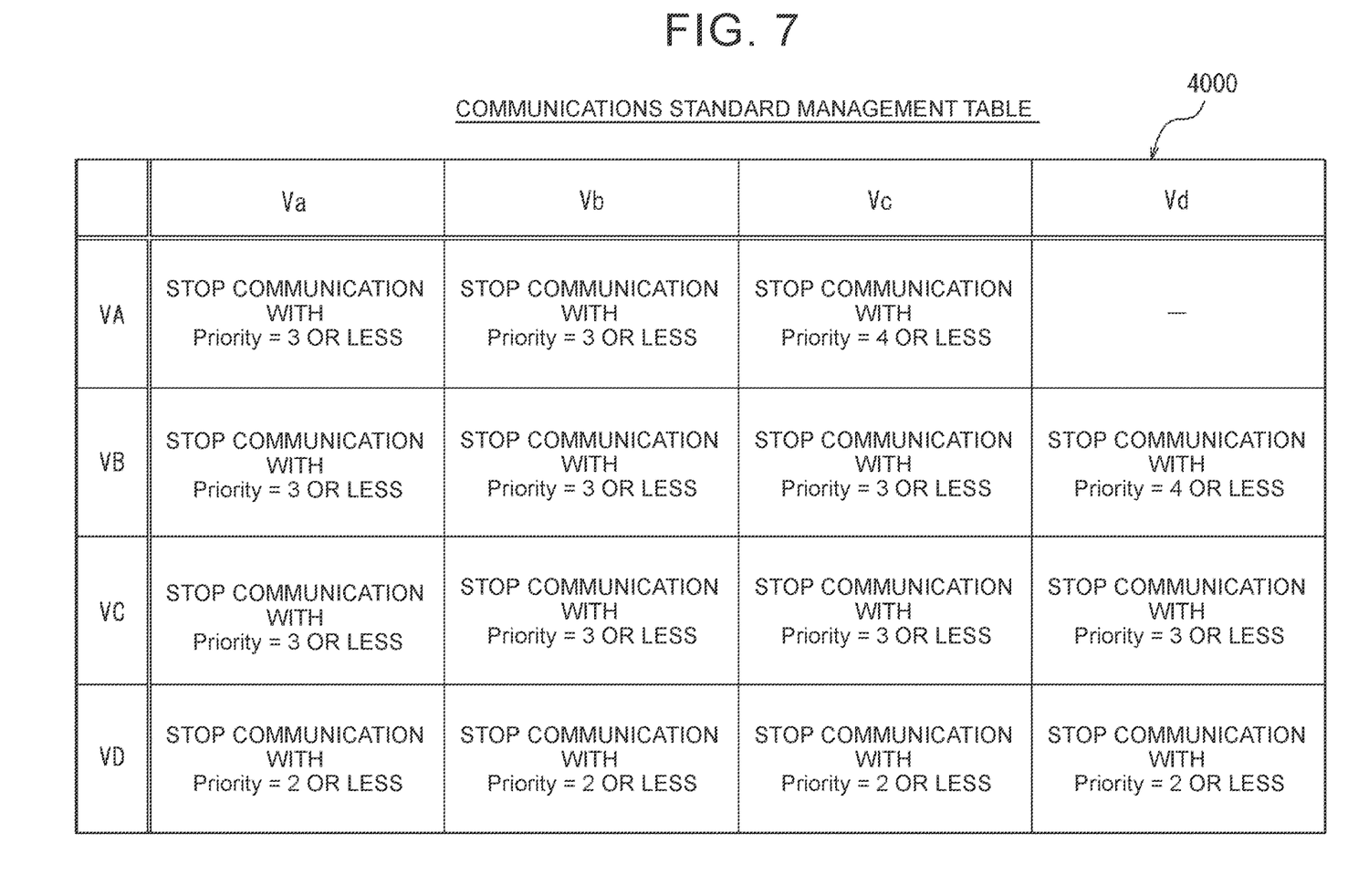
FIG. 7 is a view illustrating an example of a communications standard management table according to a second embodiment of this disclosure.

In the present embodiment, a communications standard management table 4000 illustrated in FIG. 7 is stored in the storage portion 22. The communications standard management table 4000 may be stored in an external storage device instead of being stored in the storage portion 22. The communications standard management table 4000 will be described later.

In terms of the processes from step S101 to step S103, the following describes differences from the first embodiment.

In step S101, the battery remaining amount and the traveling speed are both detected as the state of the vehicle 30. In step S102, similarly to the first embodiment, the controlling portion 21 of the in-vehicle transmitter 20 determines a battery remaining amount evaluation value for the battery remaining amount thus detected and also determines a traveling speed evaluation value for the traveling speed thus detected. In step S103, the controlling portion 21 determines which communications standard is to be restricted from being used by the communications portion 23, based on both the battery remaining amount evaluation value and the traveling speed evaluation value. More specifically, the controlling portion 21 refers to the communications standard management table 4000 illustrated in FIG. 7 and determines which communications standard is to be restricted from being used by the communications portion 23.

With reference to FIG. 7, the following describes an exemplary configuration of the communications standard management table 4000 according to the present embodiment.

The communications standard management table 4000 illustrated in FIG. 7 illustrates a communications standard the use of which is to be restricted for each of combinations of the battery remaining amount evaluation values with the traveling speed evaluation values. For example, when the battery remaining amount evaluation value is VA, and the traveling speed evaluation value is Va, the communications standard management table 4000 shows that a communications standard the priority level of which is 3 or lower is restricted from being used. When the battery remaining amount evaluation value is VB, and the traveling speed evaluation value is Va, the communications standard management table 4000 shows that a communications standard the priority level of which is 3 or lower is restricted from being used. When the battery remaining amount evaluation value is VC, and the traveling speed evaluation value is Va, the communications standard management table 4000 shows that a communications standard the priority level of which is 3 or lower is restricted from being used. When the battery remaining amount evaluation value is VD, and the traveling speed evaluation value is Va, the communications standard management table 4000 shows that a communications standard the priority level of which is 2 or lower is restricted from being used. When the battery remaining amount evaluation value is VA, and the traveling speed evaluation value is Vd, the communications standard management table 4000 shows that no communications standard is restricted from being used. In the present embodiment, a communications standard the priority level of which is 4 or lower indicates a communications standard the priority level of which is 4. A communications standard the priority level of which is 3 or lower indicates a communications standard the priority level of which is 3 and a communications standard the priority level of which is 4. A communications standard the priority level of which is 2 or lower indicates a communications standard the priority level of which is 2, a communications standard the priority level of which is 3, and a communications standard the priority level of which is 4.

In step S103, the controlling portion 21 refers to the communications standard management table 4000 in FIG. 7 and the priority level management table 3000 in FIG. 5 and determines which communications standard is to be restricted from being used by the communications portion 23. For example, when the battery remaining amount evaluation value is VA, and the traveling speed evaluation value is Va, the controlling portion 21 refers to the communications standard management table 4000 and restricts the use of the communications standard the priority level of which is 3 or lower, in accordance with the setting corresponding to the combination of the battery remaining amount evaluation value VA with the traveling speed evaluation value Va. More specifically, the controlling portion 21 refers to the priority level management table 3000 in FIG. 5 and restricts the use of the wireless LAN communications standard and the short-distance wireless communications standard as the communications standard the priority level of which is 3 or lower.

In the present embodiment, communication restrictions can be performed in consideration of both the battery remaining amount and the traveling speed as the state of the vehicle 30. For example, even in a case where the battery remaining amount of the vehicle 30 is sufficient, when the traveling speed of the vehicle 30 is high, the vehicle 30 is less likely to communicate with an external device provided outside the vehicle 30 by use of the short-distance wireless communications standard such as Bluetooth (registered trademark). In such a case, a restriction such as stopping of power supply to a module for the short-distance wireless communications standard is performed, so that the power consumption can be further reduced.

As one modification of the second embodiment, even in a case where the battery remaining amount of the vehicle 30 increases due to charging, the controlling portion 21 of the in-vehicle transmitter 20 may start to use a communications standard the use of which has been restricted. The following describes such a modification.

Figure 8:
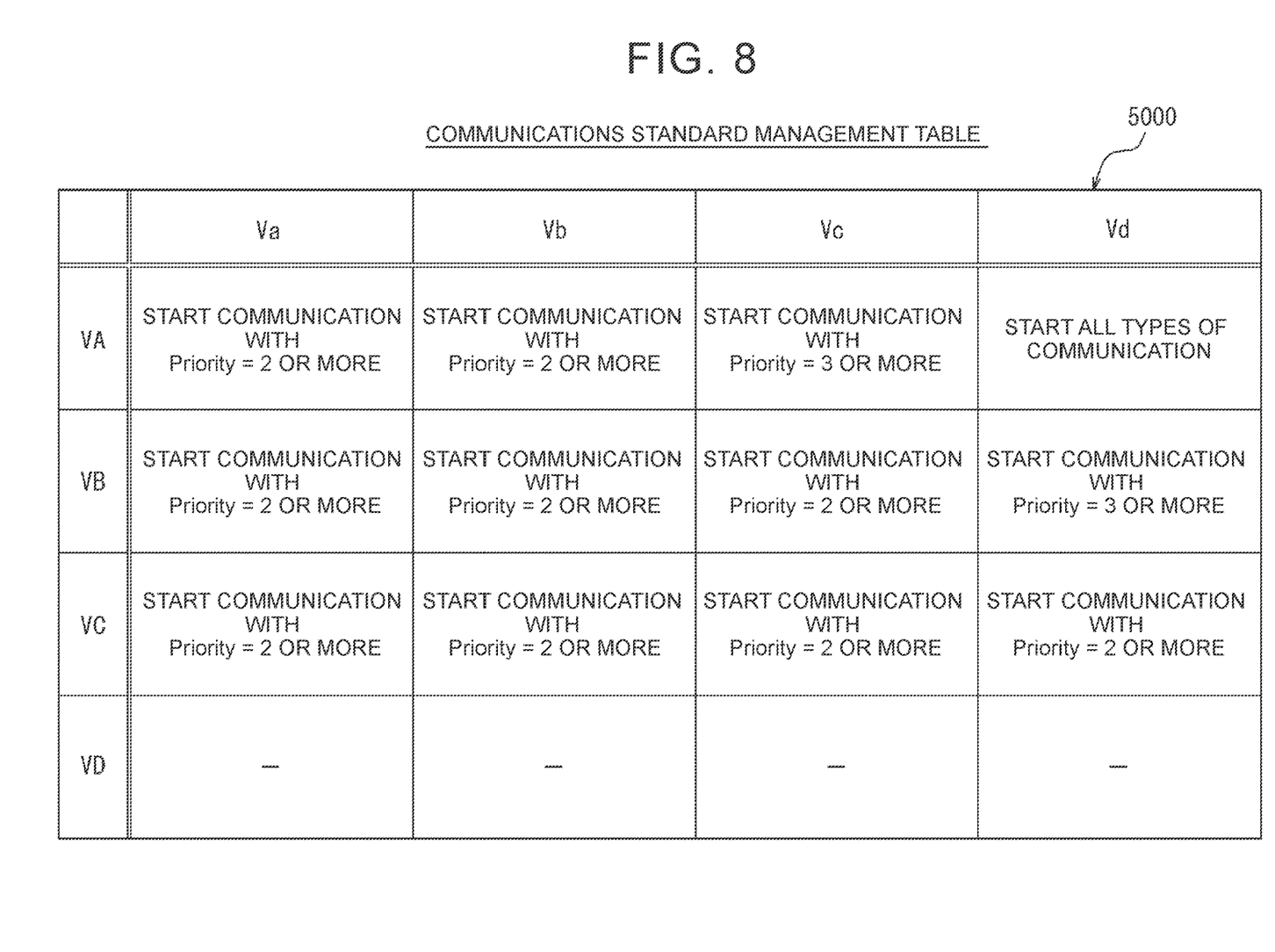
FIG. 8 is a view illustrating an example of a communications standard management table according to a modification of the second embodiment of this disclosure.

In this modification, a communications standard management table 5000 illustrated in FIG. 8 is stored in the storage portion 22. The communications standard management table 5000 may be stored in an external storage device instead of being stored in the storage portion 22. The communications standard management table 5000 will be described later.

In this modification, the processes of step S101 and step S102 are similar to those in the second embodiment. In terms of the process of step S103, the following describes differences from the second embodiment.

In step S103, the controlling portion 21 of the in-vehicle transmitter 20 determines which communications standard is started to be used by the communications portion 23, based on both the battery remaining amount evaluation value and the traveling speed evaluation value. More specifically, the controlling portion 21 refers to the communications standard management table 5000 illustrated in FIG. 8 and determines which communications standard is started to be used by the communications portion 23.

With reference to FIG. 8, the following describes an exemplary configuration of the communications standard management table 5000 according to this modification.

The communications standard management table 5000 illustrated in FIG. 8 illustrates which communications standard is started to be used for each of combinations of the battery remaining amount evaluation values with the traveling speed evaluation values. For example, when the battery remaining amount evaluation value is VA, and the traveling speed evaluation value is Va, the communications standard management table 5000 shows that a communications standard the priority level of which is 2 or higher is started to be used. When the battery remaining amount evaluation value is VB, and the traveling speed evaluation value is Va, the communications standard management table 5000 shows that a communications standard the priority level of which is 2 or higher is started to be used. When the battery remaining amount evaluation value is VC, and the traveling speed evaluation value is Va, the communications standard management table 5000 shows that a communications standard the priority level of which is 2 or higher is started to be used. When the battery remaining amount evaluation value is VD, and the traveling speed evaluation value is Va, the communications standard management table 5000 shows that no communications standard is started to be used. When the battery remaining amount evaluation value is VA, and the traveling speed evaluation value is Vd, the communications standard management table 5000 shows that all the communications standards are started to be used. In this modification, a communications standard the priority level of which is 3 or higher indicates a communications standard the priority level of which is 3, a communications standard the priority level of which is 2, and a communications standard the priority level of which is 1. A communications standard the priority level of which is 2 or higher indicates a communications standard the priority level of which is 2 and a communications standard the priority level of which is 1.

In step S103, the controlling portion 21 of the in-vehicle transmitter 20 refers to the communications standard management table 5000 in FIG. 8 and the priority level management table 3000 in FIG. 5 and determines which communications standard is started to be used by the communications portion 23. For example, in a case where the battery remaining amount evaluation value is VD and the traveling speed evaluation value is Va, but the battery remaining amount evaluation value is changed to VC due to an increase in the battery remaining amount by charging, the controlling portion 21 starts the use of the communications standard the priority level of which is 2 or higher, in accordance with the setting corresponding to the combination of the battery remaining amount evaluation value VC with the traveling speed evaluation value Va. More specifically, the controlling portion 21 refers to the priority level management table 3000 in FIG. 5 and starts the use of the V2X communications standard and the cellular communications standard as the communications standard the priority level of which is 2 or higher. That is, the controlling portion 21 keeps the use of the cellular communications standard and restarts the use of the V2X communications standard that has been restricted before charging. Alternatively, for example, in a case where the battery remaining amount evaluation value is VA and the traveling speed evaluation value is Va, but the traveling speed evaluation value is changed to Vc due to a decrease in the traveling speed, the controlling portion 21 starts the use of the communications standard the priority level of which is 3 or higher, in accordance with the setting corresponding to the combination of the battery remaining amount evaluation value VA with the traveling speed evaluation value Vc. More specifically, the controlling portion 21 refers to the priority level management table 3000 in FIG. 5 and starts the use of the wireless LAN communications standard, the V2X communications standard, and the cellular communications standard as the communications standard the priority level of which is 3 or higher. That is, the controlling portion 21 keeps the use of the V2X communications standard and the cellular communications standard and restarts the use of the wireless LAN communications standard that has been restricted before the decrease in the traveling speed.

With the present modification, the use of the communications standard that is restricted due to the battery remaining amount being low and/or due to the traveling speed being high can be restarted.

This disclosure is not limited to the above embodiments. For example, a plurality of blocks described in the block diagram may be integrated, or one block may be divided. Instead of sequentially executing a plurality of steps described in the flowchart in accordance with the description, they may be executed in parallel or in a different order in accordance with processing capacities of the devices that execute respective steps or as necessary. Furthermore, this disclosure may be variously modified without departing from the gist of this disclosure.

For example, in the first embodiment, the same priority level is assigned to the 4G standard and the 5G standard as the cellular communications standard. However, the power consumption of the 4G standard is largely different from the power consumption of the 5G standard, and therefore, in some cases, it may be desirable that the use of the 4G standard and the use of the 5G standard be restricted separately depending on the state of the vehicle 30. That is, as another modification of the first embodiment, the cellular communications standard may be divided to the 4G standard and the 5G standard, and different priority levels may be assigned thereto. For example, the power consumption of the 5G standard is larger than the power consumption of the 4G standard. Accordingly, from the viewpoint of reducing the power consumption, it is desired to restrict the use of the 5G standard. The following describes a third embodiment as such a modification.

In the present embodiment, the 4G standard or LTE is used for the emergency call function and the concierge function among the functions of the vehicle 30. In the meantime, the software download function and the first automatic parking function use the 5G standard or the wireless LAN communications standard.

Figure 9:
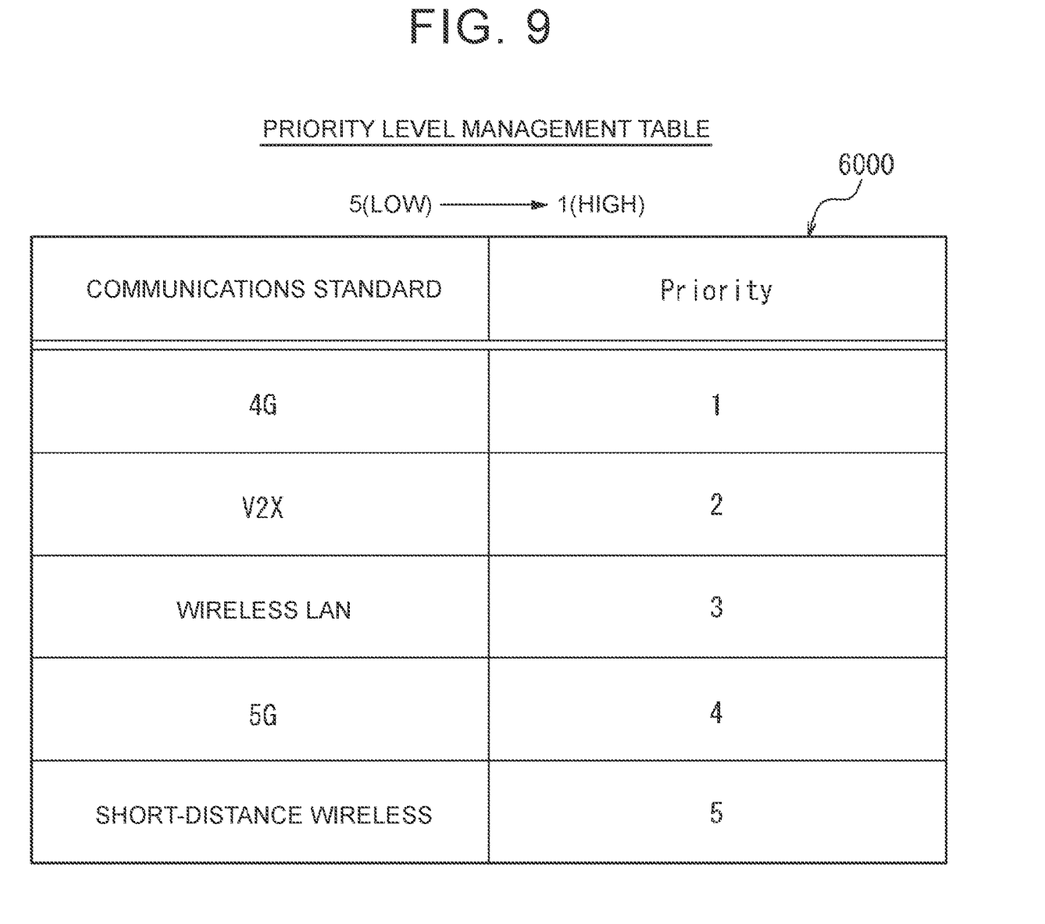
FIG. 9 is a view illustrating an example of a priority level management table according to a third embodiment of this disclosure.

With reference to FIG. 9, the following describes an exemplary configuration of a priority level management table 6000 according to the present embodiment.

In the priority level management table 6000 illustrated in FIG. 9, priority levels assigned to the communications standards used by the in-vehicle transmitter 20 as the communications device of the vehicle 30 are stored. In the present embodiment, a highest priority level of 1 is assigned to the 4G standard. A priority level of 2 is assigned to the V2X communications standard. A priority level of 3 is assigned to the wireless LAN communications standard. A priority level of 4 is assigned to the 5G standard. A lowest priority level of 5 is assigned to the short-distance wireless communications standard.

The processes of step S101 and step S102 are similar to those in the first embodiment, and therefore descriptions thereof are omitted. In step S103, when the controlling portion 21 of the in-vehicle transmitter 20 determines which communications standard is to be restricted from being used by the communications portion 23 based on the state of the vehicle 30 that is determined in step S102, the controlling portion 21 refers to the priority level management table 6000 illustrated in FIG. 9. The controlling portion 21 restricts the use of the communications standards by the communications portion 23 in order from a communications standard the assigned priority level of which is lowest in the priority level management table 6000. In the present embodiment, the controlling portion 21 restricts the use of the communications standards by communications portion 23 in order of the short-distance wireless communications standard, the 5G standard, the wireless LAN communications standard, the V2X communications standard, and the 4G standard.

In the present embodiment, the communications standards different in power consumption are separately restricted from being used in accordance with the state of the vehicle 30. More specifically, when the battery remaining amount of the vehicle 30 is low, the use of the 5G standard the power consumption of which is larger than the power consumption of the 4G standard is restricted earlier than the restriction on the use of the 4G standard. Accordingly, it is possible to keep necessary communication and to further reduce the power consumption of the vehicle 30.

What is claimed is:

1. A communications device provided in a vehicle having a plurality of functions involving communication, the communications device comprising:
a communications interface configured to use a communications standard designated for each of the plurality of functions; and
at least one processor configured to:
determine whether the communications standard is to be restricted from being used by the communications interface or not, in accordance with a state of the vehicle, wherein the state of the vehicle includes a battery remaining amount of the vehicle; and
restrict more communications standards from being used as the battery remaining amount of the vehicle is lower.

2. The communications device according to claim 1, wherein the state of the vehicle further includes a traveling speed of the vehicle.

3. The communications device according to claim 2, wherein the at least one processor is further configured to restrict the more communications standards from being used as the traveling speed is higher.

4. The communications device according to claim 1, wherein the at least one processor is further configured to restrict the more communications standards from being used by the communications interface in an order from a communications standard with a shortest communicable distance.

5. The communications device according to claim 1, wherein:
priority levels determined based on the plurality of functions are assigned to respective communications standards; and
the at least one processor is further configured to restrict the more the communications standards from being used by the communications interface in an order from a communications standard to which a lowest priority level is assigned.

6. The communications device according to claim 1, wherein the at least one processor is further configured to stop communication using the communications standard.

7. The communications device according to claim 1, wherein the at least one processor is further configured to restrict a speed of communication using the communications standard.

8. The communications device according to claim 1, wherein the at least one processor is further configured to stop at least one function corresponding to the communications standard.

9. The communications device according to claim 1, wherein the communications interface is further configured to communicate with an external device provided outside the vehicle by use of the communications standard.

10. A vehicle comprising a communications device according to claim 1.

11. A control method for controlling a communications device provided in a vehicle having a plurality of functions involving communication, the control method comprising:
using, by a communications interface, a communications standard designated for each of the plurality of functions;
determining whether the communications standard is to be restricted from being used by the communications interface or not, in accordance with a state of the vehicle, wherein the state of the vehicle includes a battery remaining amount of the vehicle; and
restricting more communications standards from being used as the battery remaining amount of the vehicle is lower.

12. The control method according to claim 11, wherein the state of the vehicle further includes a traveling speed of the vehicle.

13. The control method according to claim 12, wherein the restricting of the more communications standards includes restricting the more communications standards from being used as the traveling speed is higher.

14. The control method according to claim 11, wherein the restricting of the more communications standards includes restricting the more communications standards from being used by the communications interface in an order from a communications standard with a shortest communicable distance.

15. The control method according to claim 11, wherein:
priority levels determined based on the plurality of functions are assigned to respective communications standards; and
the restricting of the more communications standards includes restricting the more communications standards from being used by the communications interface in an order from a communications standard to which a lowest priority level is assigned.

16. A non-transitory computer-readable storage medium storing computer-executable instructions that, when executed by at least one processor of a computer, cause the computer to:
function as a communications device provided in a vehicle having a plurality of functions involving communication and including a communications interface configured to use a communications standard designated for each of the plurality of functions,
determine whether the communications standard is to be restricted from being used by the communications interface or not, in accordance with a state of the vehicle, wherein the state of the vehicle includes a battery remaining amount of the vehicle, and
restrict more communications standards from being used as the battery remaining amount of the vehicle is lower.

* * * * *